US012636726B2

(12) United States Patent
Laymon et al.

(10) Patent No.: US 12,636,726 B2
(45) Date of Patent: May 26, 2026

(54) APPARATUS FOR PIPE PURGING

(71) Applicant: Airgas, Inc., Radnor, PA (US)

(72) Inventors: Scott Laymon, Kingston, GA (US);
Frederick A. Schweighardt, Cypress,
TX (US)

(73) Assignee: Airgas, Inc., Radnor, PA (US)

( * ) Notice: Subject to any disclaimer, the term of this
patent is extended or adjusted under 35
U.S.C. 154(b) by 1157 days.

(21) Appl. No.: 17/585,743

(22) Filed: Jan. 27, 2022

(65) Prior Publication Data

US 2022/0234131 A1      Jul. 28, 2022

Related U.S. Application Data

(60) Provisional application No. 63/142,088, filed on Jan.
27, 2021.

(51) Int. Cl.
B23K 9/32          (2006.01)
B23K 101/10        (2006.01)
(52) U.S. Cl.
CPC .......... B23K 9/326 (2013.01); B23K 2101/10
(2018.08)
(58) Field of Classification Search
CPC ............................ B23K 2101/10; B23K 9/326
USPC ........................................................ 219/74
See application file for complete search history.

(56) References Cited

U.S. PATENT DOCUMENTS 2,202,577 A  *  5/1940  Evans ................... A61C 9/0013
                                                        433/35
2,254,314 A  *  9/1941  Reed ..................... B23K 5/003
                                                        219/161
2,802,092 A  *  8/1957  Hauck ................... B23K 9/326
                                                        219/60 R
2,819,517 A  *  1/1958  Pursell ................. B23K 33/004
                                                        219/60 R
3,194,466 A  *  7/1965  Davis .................... B23K 9/325
                                                        219/60 R
3,292,254 A  *  12/1966  Sloan .................... B23K 9/325
                                                        219/60 R
3,387,761 A  *  6/1968  Pickard .............. B23K 37/0531
                                                        219/60 R
3,597,833 A  *  8/1971  Frederick .............. B23K 35/38
                                                        228/136

(Continued)

FOREIGN PATENT DOCUMENTS

GB              2383108 A  *  6/2003  ......... B23K 37/0531

*Primary Examiner* — Jimmy Chou
(74) *Attorney, Agent, or Firm* — Allen E. White

(57)                    ABSTRACT

An apparatus for providing an inert atmosphere to the inside
of a piping assembly prior to and during welding, including
a cannister, and a bladder which surrounds the cannister and
fits inside of a piping assembly to be welded. The cannister
including a purge gas inlet connection fluidically connected
to a bladder fill conduit, a bladder return conduit fluidically
connected to a pressure relief device, the pressure relief
device fluidically connected to a reduced pressure purge gas
conduit, a primary purge gas diffuser, a secondary purge gas
diffuser, a tertiary purge gas diffuser, and purge gas exit
holes. Wherein the bladder fill conduit is configured to
introduce purge gas into the bladder. Wherein the bladder is
configured to expand and form a seal between the cannister
and the piping assembly to be welded. And, wherein the
bladder return conduit is configured to evacuate excess
purge gas from the bladder.

17 Claims, 4 Drawing Sheets

(56) References Cited

U.S. PATENT DOCUMENTS

| | | | | |
|---|---|---|---|---|
| 3,633,813 A * | 1/1972 | Looney | B23K 37/0531 | 228/41 |
| 3,724,273 A * | 4/1973 | Awrey | F16L 55/1608 | 228/119 |
| 3,765,665 A * | 10/1973 | Work | B23Q 9/0021 | 228/44.5 |
| 3,937,382 A * | 2/1976 | Cunningham | B23K 37/0531 | 228/49.3 |
| 4,096,372 A * | 6/1978 | Hallenbeck | B23K 9/326 | 219/136 |
| 4,101,067 A * | 7/1978 | Sloan | B23K 31/027 | 219/136 |
| 4,454,405 A * | 6/1984 | Riley | B23K 9/035 | 219/60 R |
| 4,528,436 A * | 7/1985 | Stol | B23K 9/0282 | 219/61 |
| 4,815,650 A * | 3/1989 | Reaux | F16L 55/1608 | 228/186 |
| 4,828,160 A * | 5/1989 | Sundholm | B23K 9/326 | 269/22 |
| 4,875,615 A * | 10/1989 | Savard | B23K 9/325 | 29/402.13 |
| 4,931,612 A * | 6/1990 | Belleride | B23K 9/325 | 219/60 R |
| 5,090,608 A * | 2/1992 | Jones | B23K 37/0531 | 269/48.1 |
| 5,100,043 A * | 3/1992 | Hallenbeck | B23K 9/326 | 228/42 |
| 5,126,526 A * | 6/1992 | Schnorrer | B23K 9/326 | 219/60 R |
| 5,187,343 A * | 2/1993 | Edwards | B23K 9/326 | 219/60 R |
| 5,217,156 A * | 6/1993 | Schnorrer | B23K 9/326 | 219/60 R |
| 5,235,152 A * | 8/1993 | Jankus | B23K 9/326 | 219/60 R |
| 5,304,776 A * | 4/1994 | Buerkel | B23K 9/167 | 219/60 R |
| 5,389,314 A * | 2/1995 | Wang | A61M 25/10 | 264/156 |
| 5,390,846 A * | 2/1995 | Thode | B23K 9/326 | 228/8 |
| 5,435,478 A * | 7/1995 | Wood | B23K 9/162 | 219/60 R |
| 5,471,030 A * | 11/1995 | Boula | B23K 15/0013 | 219/121.13 |
| 5,484,973 A * | 1/1996 | Gittens | B23K 9/162 | 219/61 |
| 5,601,225 A * | 2/1997 | Wood | B23K 9/0286 | 228/9 |
| 5,669,547 A * | 9/1997 | Spring | B23K 9/164 | 228/48 |
| 5,710,414 A * | 1/1998 | Matsen | B32B 37/06 | 219/645 |
| 5,827,265 A * | 10/1998 | Glinsky | A61F 2/958 | 606/8 |
| 5,864,111 A * | 1/1999 | Barefoot | B23K 9/0286 | 219/61 |
| 6,637,640 B1 * | 10/2003 | Sennett | B23K 9/325 | 228/17 |
| 6,739,204 B1 * | 5/2004 | Barefoot | B23K 37/0533 | 219/136 |
| 6,779,944 B2 * | 8/2004 | Schnorrer | B23K 37/0531 | 403/374.1 |
| 7,112,358 B1 * | 9/2006 | Hacikyan | B23K 9/325 | 428/192 |
| 7,632,556 B1 * | 12/2009 | Hacikyan | B23K 9/32 | 156/291 |
| 8,450,631 B2 * | 5/2013 | Sato | B23K 9/32 | 219/121.21 |
| 8,530,777 B2 * | 9/2013 | Silk | B23K 9/164 | 219/60 R |
| 8,616,432 B1 * | 12/2013 | Hacikyan | B23K 9/32 | 228/42 |
| 9,296,060 B2 * | 3/2016 | Hacikyan | B23K 9/326 | |
| 9,341,300 B2 * | 5/2016 | Hacikyan | B23K 9/326 | |
| 9,586,284 B2 * | 3/2017 | Evans | B23K 9/326 | |
| 9,969,031 B2 * | 5/2018 | Clemmons | B23K 37/0276 | |
| 10,035,213 B2 * | 7/2018 | Shirai | B23K 9/167 | |
| 10,036,492 B2 * | 7/2018 | Liao | F16L 17/10 | |
| 10,160,054 B2 * | 12/2018 | Neil | B23K 9/326 | |
| 10,160,067 B2 * | 12/2018 | Nelli | B23K 37/00 | |
| 10,413,990 B2 * | 9/2019 | Hacikyan | B32B 7/12 | |
| 10,654,122 B2 * | 5/2020 | Hacikyan | B23K 9/326 | |
| 11,278,982 B2 * | 3/2022 | Kadlec | B23K 9/095 | |
| 11,684,993 B2 * | 6/2023 | Nolfi | B23K 9/326 | 228/219 |
| 11,892,112 B2 * | 2/2024 | Barnstable | F16L 55/134 | |
| 12,220,761 B2 * | 2/2025 | Shemkunas | B23K 20/129 | |
| 2003/0070743 A1 * | 4/2003 | Kesapradist | B29C 66/3242 | 156/158 |
| 2006/0068142 A1 * | 3/2006 | Hacikyan | C09J 7/20 | 428/40.1 |
| 2009/0018486 A1 * | 1/2009 | Goren | A61M 29/02 | 604/509 |
| 2009/0145884 A1 * | 6/2009 | Ammann | B23K 9/326 | 219/74 |
| 2009/0230104 A1 * | 9/2009 | Domec | C21D 10/005 | 219/121.78 |
| 2010/0012625 A1 * | 1/2010 | Silk | G05D 7/0652 | 219/59.1 |
| 2010/0051672 A1 * | 3/2010 | Nunnery | B23K 37/0531 | 228/44.5 |
| 2011/0210112 A1 * | 9/2011 | Boatner, Jr. | B23K 31/02 | 29/559 |
| 2012/0125600 A1 * | 5/2012 | Smith | F16L 55/134 | 166/127 |
| 2013/0284297 A1 * | 10/2013 | Hacikyan | B23K 9/326 | 138/93 |
| 2014/0117068 A1 * | 5/2014 | Hacikyan | B23K 9/325 | 228/57 |
| 2014/0326779 A1 * | 11/2014 | Hacikyan | B23K 9/326 | 228/42 |
| 2015/0083785 A1 * | 3/2015 | Park | B23K 37/0531 | 228/33 |
| 2016/0074955 A1 * | 3/2016 | Evans | B23K 9/16 | 228/42 |

* cited by examiner

APPARATUS FOR PIPE PURGING

CROSS REFERENCE TO RELATED APPLICATIONS

This application claims the benefit of priority under 35 U.S.C. § 119 (a) and (b) to U.S. Provisional Patent Application No. 63/142,088, filed Jan. 27, 2021, the entire contents of which are incorporated herein by reference.

BACKGROUND

Reactive metals will react with oxygen when at or near their melting point. These reactions result in oxide formations to the weld which can be detrimental to the mechanical properties and corrosion resistance of the weld. In such applications it is often necessary to purge the inside atmosphere to 10 to 50 ppm (parts per million) of oxygen. This often requires a considerable amount of time and gas depending on the methods employed and the total volume (eg: standard cubic feet) to be purged.

The most commonly used method is inefficient regarding both time and volume of gas required to reach a predetermined rest oxygen level (ppm). There are effective methods in existence such as purge systems which consist of 2 inflatable bladders installed on each side of the joint to be welded, sealing off a small section (typically 12") of the inside of the pipe in the immediate area where the inside of the weld will be. Once the area is sealed, the purge gas is introduced to the sealed off section through a small gas diffuser (typically 0.75" diameter or less). The purge gas fills the sealed section of the inside of the pipe, replacing with the inert atmosphere. While these are effective, they are not applicable in all circumstances due to length, size and or configuration of the piping system.

One of the primary challenges to effective, efficient purging is minimizing the amount of mixing or dilution of the purge gas and the atmosphere to be purged. Typically, the diffuser end of the purge gas supply line is far less in diameter than the inside diameter of the pipe to be purged (ex; ¾" diffuser into a 12" diameter pipe). The inherent effect will be that the purge gas mixes with the atmosphere inside the pipe for considerable time.

Industrial pipe systems involve multiple pipe configurations, involving various diameters and wall thicknesses often joined to one of numerous connection elements such as flanges, elbows, T-type fittings etc. Drawings as representations of a pipe section that needs to be created are drafted by engineers. These drawings provide the details of the angles, fitting sizes, weld types and sizes in addition to other specifications needed to create the desired pipe structures. The assembly process generally begins with preparing the segments. For full penetration welds, bevels are typically created on the pipe ends along with other pipe end or surface preparations. Next the components are generally tack welded together to align the pipe sections for single or multi-pass welding.

It is common that weld procedures require a maximum oxygen level (and sometimes nitrogen) to be achieved prior to welding (rest oxygen level) and maintained until the weld is complete or until the root pass will not be re-heated to susceptible temperature by subsequent weld passes. The process of performing single or mufti-pass full penetration welds generally involves the steps of a) purging the inside of the pipe to the required rest oxygen ppm level, b) maintaining the rest oxygen level until welding is complete or enough passes have been completed so the root pass can no longer reach a susceptible temperature, c) creating a first weld seal (root pass) of two section of pipe, d) performing a subsequent weld over the previous weld, and e) repeating step d) until the piping sections are fully welded together across the thickness of the pipe wall, including weld reinforcement.

A major materials issue with multi-pass welding of pipes is the structural integrality of the resulting weld. It is critical in e.g. nuclear reactors, that pipes handling reactor coolant not fail due to rupture. A stress fracture of key pipes in a refinery could result in catastrophic failure causing great damage and endangering many lives. It is thus essential that these welded structures adequately withstand the extreme conditions to which they are exposed.

Thus, there is a need in the industry to effectively and efficiently purge the atmosphere from the inside of a given length or assembly of pipe and replace the ambient atmosphere with an inert atmosphere prior to, and during welding.

SUMMARY

An apparatus for providing an inert atmosphere to the inside of a piping assembly prior to and during welding, including a cannister, and a bladder which surrounds the cannister and fits inside of a piping assembly to be welded. The cannister including a purge gas inlet connection fluidically connected to a bladder fill conduit, a bladder return conduit fluidically connected to a pressure relief device, the pressure relief device fluidically connected to a reduced pressure purge gas conduit, a primary purge gas diffuser, a secondary purge gas diffuser, a tertiary purge gas diffuser, and purge gas exit holes. Wherein the bladder fill conduit is configured to introduce purge gas into the bladder. Wherein the bladder is configured to expand and form a seal between the cannister and the piping assembly to be welded, And, wherein the bladder return conduit is configured to evacuate excess purge gas from the bladder.

BRIEF DESCRIPTION OF THE FIGURES

For a further understanding of the nature and objects for the present invention, reference should be made to the following detailed description, taken in conjunction with the accompanying drawings, in which like elements are given the same or analogous reference numbers and wherein.

ELEMENT NUMBERS

Figure 1:
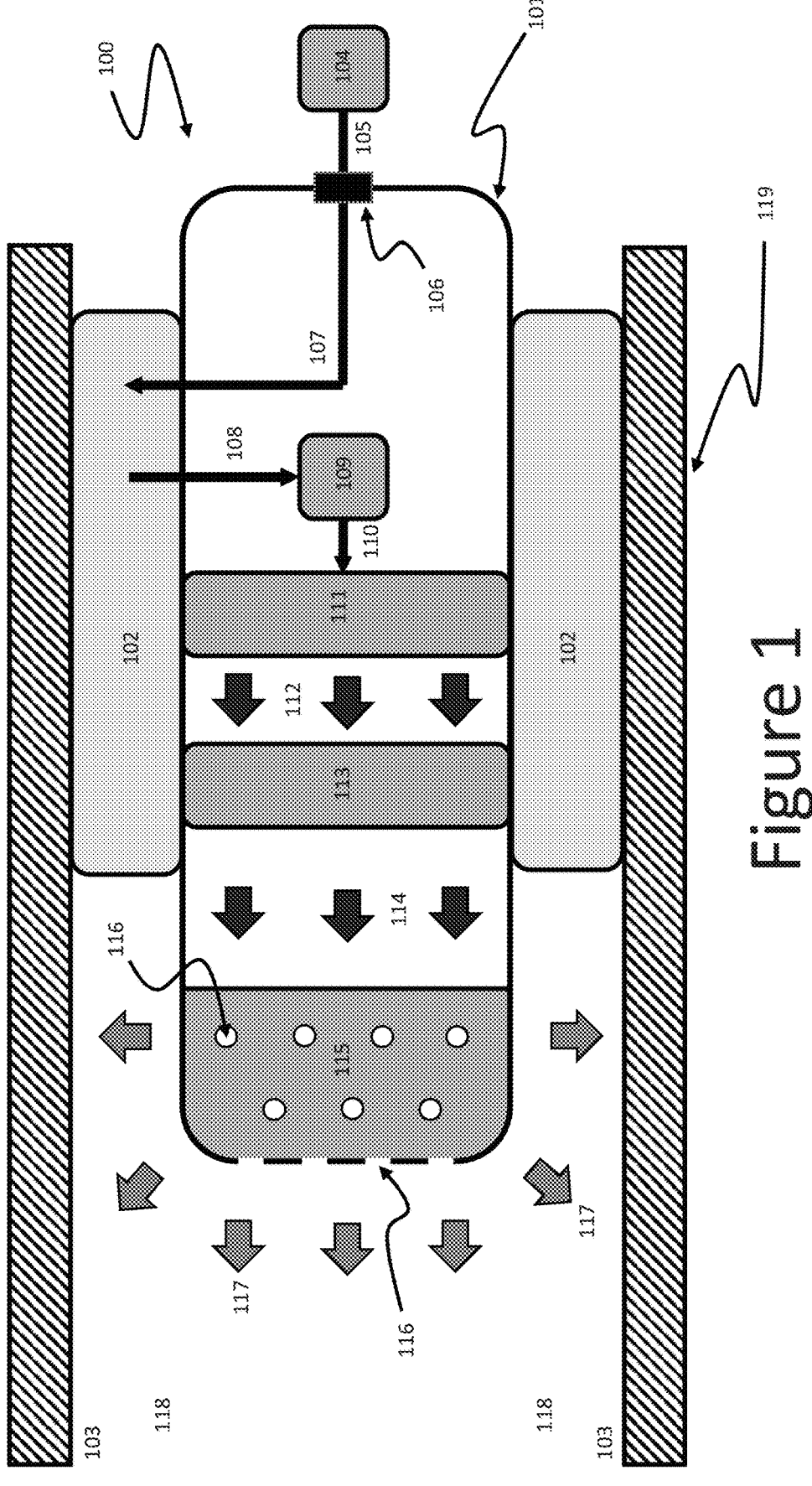
FIG. 1 is a schematic representation of the internal pipe inerting device inserted and operation, in accordance with one embodiment of the present invention.

100=internal pipe inerting device
101=canister
102=bladder
102a=deflated or underinflated bladder 102b=inflated bladder
103=pipe wall
104=purge gas source
105=purge gas supply conduit
106=purge gas inlet connection
107=bladder fill conduit
108=bladder return conduit
109=pressure relief device
110=reduced pressure purge gas conduit
111=primary purge gas diffuser
112=first diffused purge gas stream
113=secondary purge gas diffuser
114=second diffused pure gas stream
115=tertiary purge gas diffuser
116=purge gas exit holes
117=third diffused purge gas stream
118=pipe interior volume
119=piping assembly to be welded

DESCRIPTION OF PREFERRED EMBODIMENTS

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

As discussed above, the typical systems in industrial use presently often result in a mixture of both atmosphere and the purge gas exiting the exhaust hole or port in the piping system being purged, until eventually most of the oxygen is expelled. The present apparatus is designed so that the total area (in$^2$) of the diffused purge gas entering the inside of the pipe will be equal to or near equal to the inside diameter of the pipe being purged. This significantly minimizes the purge gas mixing with the atmosphere which will provide a more efficient, effective and stable purge. The time and gas volume required is significantly reduced.

Turning to FIG. 1, internal pipe inerting device 100 includes canister 101 and bladder 102. Bladder 102 may be a cylindrical shell configured to surround canister 101 and contact the inside wall 103 of the section of pipe to be welded 119. Purge gas supply conduit 105 is attached to both purge gas inlet connection 106 on canister 101 and purge gas source 104. The purge gas flows through bladder fill conduit 107, which resides inside of canister 101, and then into bladder 102, subsequently inflating bladder 102. Bladder 102 is designed such that when fully inflated, the outside diameter is equal to, or preferably slightly greater than, the maximum inside diameter for each nominal pipe size. Once inflated, bladder 102 seals canister 101 inside the section of pipe to be welded 119.

Excess purge gas then exists through bladder return conduit 108 and into pressure relief device 109. Reduced pressure purge gas conduit 110 then enters primary purge gas diffuser 111. First diffused purge gas stream 112 exits primary purge gas diffuser 111 and is more evenly spread throughout the interior volume of canister 101. First diffused purge gas stream 112 then enters secondary purge gas diffuser 113. Second diffused purge gas stream 114 exits secondary purge gas diffuser 113 and is still more evenly spread out. Second diffused purge gas stream 114 then enters tertiary purge gas diffuser 115. Third diffused purge gas stream 117 then exits canister 101 through purge gas exit holes 116 and fills pipe interior volume 118.

In one embodiment of the present invention, primary purge gas diffuser 111 may be made up of coils of perforated tubing used to initially disperse the purge gas into the initial reservoir of canister 101. Secondary purge gas diffuser 113 may be made up of layers of steel wool for diffusion. Tertiary purge gas diffuser 115 may be made up of a metal screen affixed to the end of canister 101 for further diffusion prior to entering interior pipe volume 118. This ensures that the area of the purge gas is equal to or near equal to the ID of the pipe which significantly increases the efficiency and effectiveness of the purging process.

Purge gas source 104 may be cylinders (liquid or high pressure) or other means including bulk, micro bulk, on-site generation. Pressure and flow may be regulated prior to entering the canister.

Canister 101 may be a cylindrical container made of metal or other durable material. Canister 101 may have a length CL of between 3" and 12", preferably between 3" to 6" depending on the nominal pipe size. Canister 101 may have a length CL greater than 12" depending on the pipe diameter. The canister 101 may have a diameter CD that is equal to approximately 1" less than the smallest inside diameter ID of each nominal pipe size ranging from 4" to 36". As used herein, the term "approximately 1" less" is defined as being between ¾" and 1¼", preferably between ⅞" and 1⅛" less than the ID of the pipe. Canister 101 may be closed, air-tight on the inlet end, with purge gas inlet connection 106 which may include an inert gas fitting. The outlet end of canister 101 is covered with a metal screen which may act as tertiary purge gas diffuser 115. There may be additional purge gas exit holes 116 or ports around the perimeter of canister 101, located near the outlet end to allow purge gas to flow into the annular space between the canister and the pipe walls.

Bladder 102 may be constructed of a flexible, heat and tear resistant material capable of withstanding up to 50 psig pressure. Bladder 102 is inflated and pressurized by the purge gas. Once inflated, bladder 102 seals off the inside of the pipe preventing further atmospheric contamination. Bladder 102 is continuous around the perimeter of cannister 101 to which it may be permanently affixed and sealed.

Pressure relief device 109 may be is a low-pressure relief device located inside canister 101 immediately downstream of bladder 102. Purge gas flows from bladder 102 to pressure relief device 109, which provides adequate back pressure to bladder 102 in order to maintain pressure (app. 10-50 psig) to the bladder. The purge gas then flows from the pressure relief device 109 to primary purge gas diffuser 111.

Primary purge gas diffuser 111 may be made of coils constructed of a durable heat resistant material such as copper or stainless steel tubing. The coils may be situated around the inside perimeter of canister 101 with inwardly facing holes or ports to provide multiple purge gas outlets to the inside of canister 101. The diameter, spacing and number of holes and/or coils may vary depending on the nominal pipe size designed for.

Secondary purge gas diffuser 113 may include layers of generic steel wool which are situated inside canister 101 immediately downstream of the primary purge gas diffuser 111. The purge gas may flow from the perforated coils through the steel wool which further diffuses the purge gas stream prior to exiting through the diffuser screen. The size and thickness of the steel wool may vary according to the nominal pipe size the canister is designed for.

Tertiary purge gas diffuser 115 may include a diffuser screen which is constructed of metal and is permanently affixed to the outlet end of the diffuser. The screen provides additional diffusion of the purge gas as it enters the inside of the pipe.

In some situations, related to full penetration welds, the weld area must be free from oxygen and sometimes nitrogen if desired. The devices and methods described herein provide a readily adopted way of providing an inert atmosphere in the weld area which would be free from oxygen and/or nitrogen depending on the purge gas chosen.

An apparatus suitable for practicing the invention herein may include a number of other components including an oxygen analyzer/monitor to provide a continuous monitoring of the oxygen levels prior to and during welding.

Figure 2:
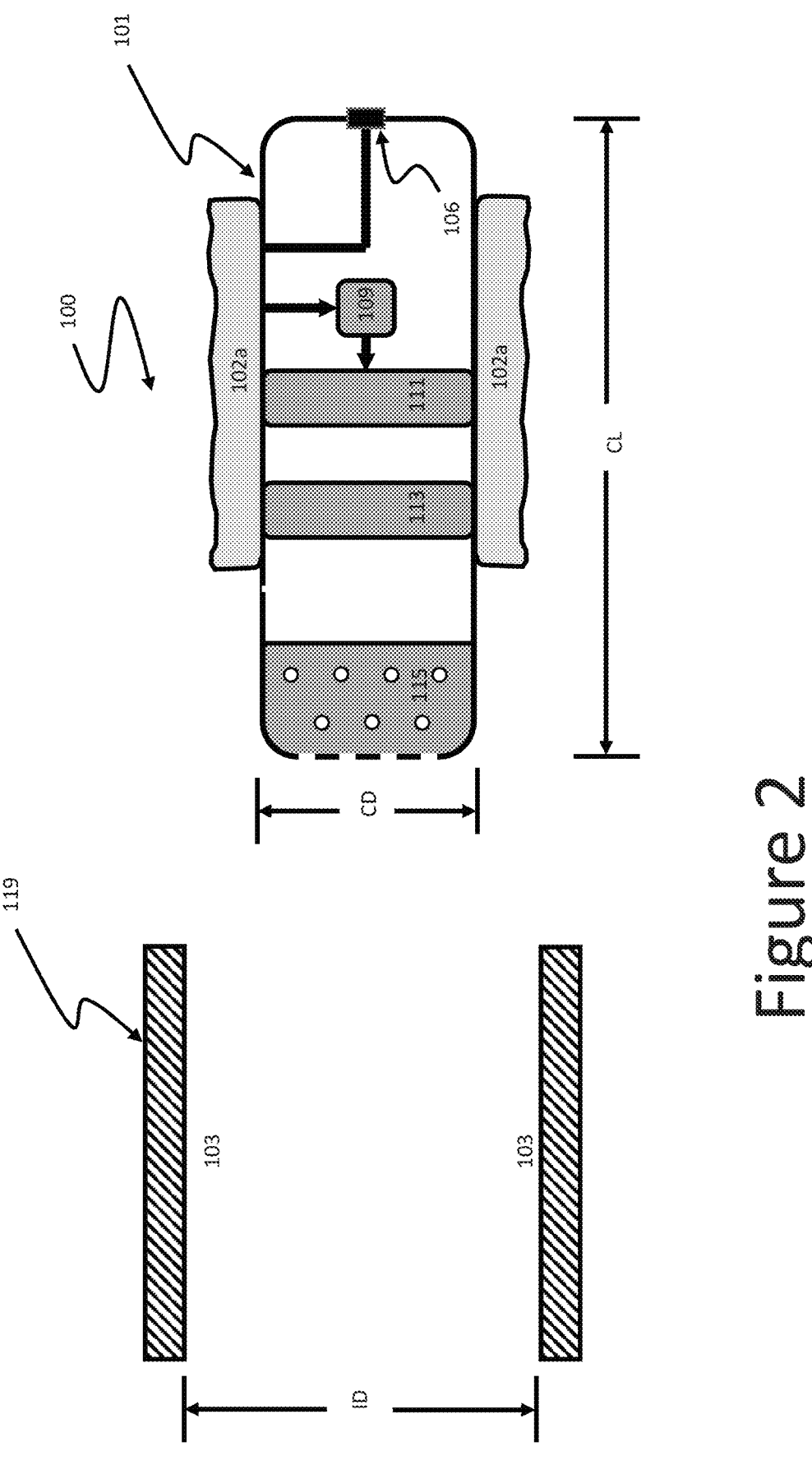
FIG. 2 is a schematic representation of the internal pipe inerting device with deflated bladders prior to insertion into the piping assembly to be welded, in accordance with one embodiment of the present invention.
Figure 3:
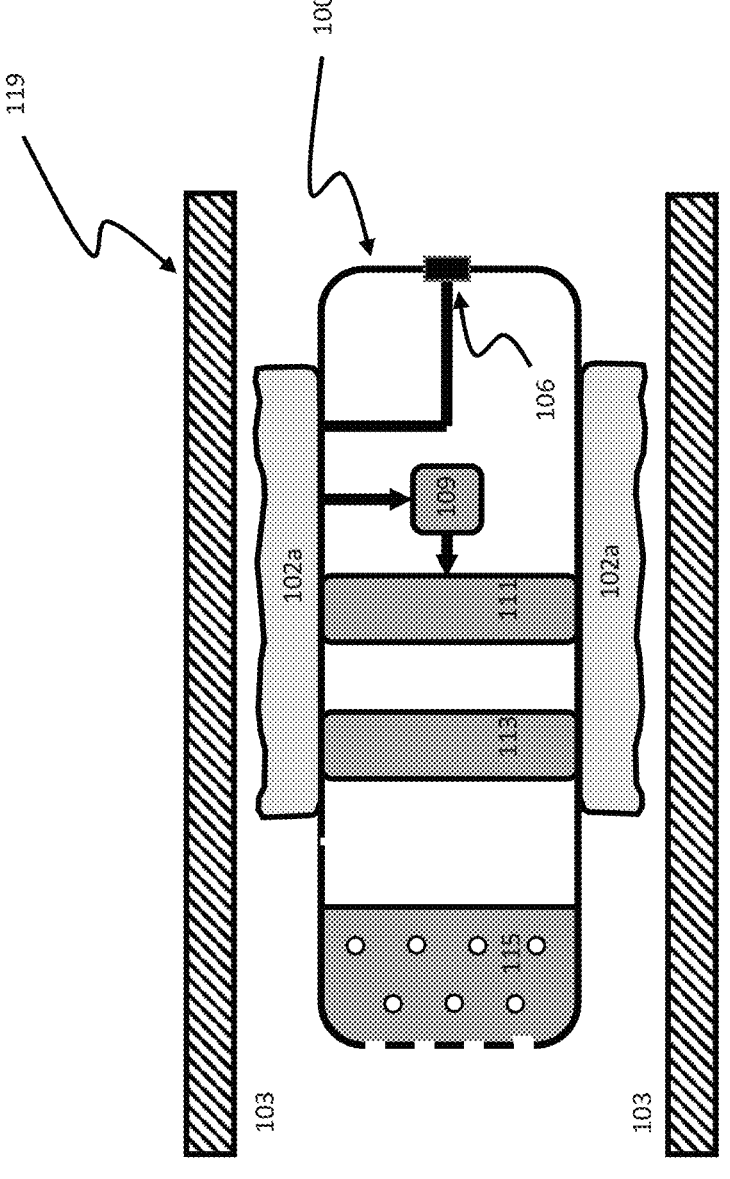
FIG. 3 is a schematic representation of the internal pipe inerting device with deflated bladders after insertion into the piping assembly to be welded, in accordance with one embodiment of the present invention.

Turning now to FIGS. 1-4, a method of inerting an internal volume of a pipe to be welded is shown. Internal pipe inerting device 101, as described in detail above, is prepared for insertion into the piping assembly to be welded 119. As indicated in FIGS. 2 and 3, at this time, bladder 102*a* is deflated or underinflated, in order for internal pipe inciting device 101 to be inserted.

Figure 4:
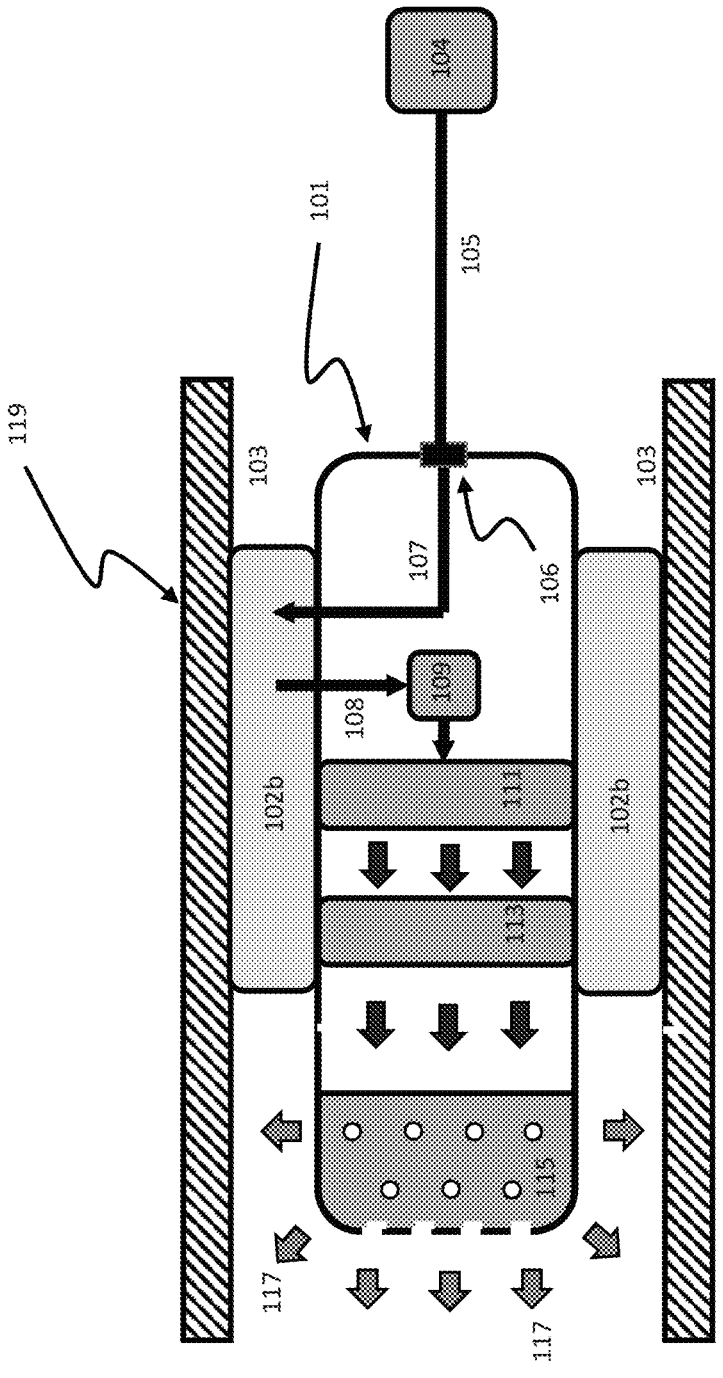
FIG. 4 is a schematic representation of the internal pipe inerting device with inflated bladders after insertion into the piping assembly to be welded, in accordance with one embodiment of the present invention.

As indicated in FIG. 4, once internal pipe inerting device 101 is inserted into the desired location within the piping assembly to be welded 119, pressurized inert gas is delivered from purge gas source 104, through purge gas supply conduit 105. The purge gas then passes through purge gas inlet connection 106, through purge gas fill conduit 107, and into bladder 102*b*, which inflates. As bladder 102 inflates, it forms a seal between cannister 101 and the piping assembly to be welded 119.

Once bladder 102*b* has reached the desired sealing pressure, purge gas then reenters cannister 101 through bladder return conduit 108, As indicated in detail in FIG. 1, pressure relief device 109 the reduces the pressure of the purge gas and introduces it into the primary purge gas diffuser 111. First diffused purge gas stream 112 exits primary purge gas diffuser 111 and is more evenly spread throughout the interior volume of canister 101, First diffused purge gas stream 112 then enters secondary purge gas diffuser 113. Second diffused purge gas stream 114 exits secondary purge gas diffuser 113 and is still more evenly spread out. Second diffused purge gas stream 114 then enters tertiary purge gas diffuser 115. Third diffused purge gas stream 117 then exits canister 101 through purge gas exit holes 116 and fills pipe interior volume 118.

What is claimed:

1. An apparatus for providing an inert atmosphere to the inside of a piping assembly prior to and during welding, comprising:
   a cannister, and a bladder which surrounds the cannister and fits inside of a piping assembly to be welded, the cannister comprising;
      a purge gas inlet connection fluidically connected to a bladder fill conduit, a bladder return conduit fluidically connected to a pressure relief device,
      the pressure relief device fluidically connected to a reduced pressure purge gas conduit,
      a primary purge gas diffuser,
      a secondary purge gas diffuser,
      a tertiary purge gas diffuser, and
      purge gas exit holes,
   wherein the bladder fill conduit is configured to introduce purge gas into the bladder,
   wherein the bladder is configured to expand and form a seal between the cannister and the piping assembly to be welded, and
   wherein the bladder return conduit is configured to evacuate excess purge gas from the bladder.

2. The apparatus of claim 1, wherein the cannister has a diameter approximately 1 inch less than the smallest inside diameter of the piping assembly to be welded.

3. The apparatus of claim 1, wherein the cannister has a length of between 3 inches and 12 inches.

4. The apparatus of claim 1, wherein the bladder comprises a flexible, heat and tear resistant material configured to withstand 50 psig of internal pressure.

5. The apparatus of claim 1, wherein the pressure relief device is configured to maintain a pressure of between 5 psig and 50 psig in the bladder.

6. The apparatus of claim 1, wherein the primary purge diffuser comprises perforated coils constructed of copper or stainless steel tubing.

7. The apparatus of claim 1, wherein the secondary purge diffuser comprises layers of steel wool.

8. The apparatus of claim 1, wherein the tertiary purge diffuser comprises a metal screen.

9. An apparatus for providing an inert atmosphere to the inside of a piping assembly prior to and during welding, comprising:
   a cannister, and a bladder which surrounds the cannister and fits inside of the piping assembly to be welded, the cannister comprising:
      a purge gas inlet connection fluidically connected to a bladder fill conduit,
      a bladder return conduit fluidically connected to a pressure relief device,
      the pressure relief device fluidically connected to a reduced pressure purge gas conduit,
      at least one purge gas diffuser, and
      purge gas exit holes,
   wherein the bladder fill conduit is configured to introduce purge gas into the bladder,
   wherein the bladder is configured to expand and form a seal between the cannister and the piping assembly to be welded, and
   wherein the bladder return conduit is configured to evacuate excess purge gas from the bladder,
   wherein the bladder comprises a flexible, heat and tear resistant material configured to withstand 50 psig of internal pressure.

10. The apparatus of claim 9, wherein the cannister has a diameter between ⅞" and 1⅛" less than the smallest inside diameter of the piping assembly to be welded.

11. The apparatus of claim 9, wherein the cannister has a length of between 3 inches and 12 inches.

12. The apparatus of claim 9, wherein the pressure relief device is configured to maintain a pressure of between 5 psig and 50 psig in the bladder.

13. The apparatus of claim 9, wherein the at least one purge diffuser is selected from the group consisting of perforated coils constructed of copper or stainless steel tubing, layers of steel wool, and a metal screen.

14. An apparatus for providing an inert atmosphere to the inside of a piping assembly prior to and during welding, comprising:

a cannister, and a bladder which surrounds the cannister and fits inside of the piping assembly to be welded, the cannister comprising:

a purge gas inlet connection fluidically connected to a bladder fill conduit, a bladder return conduit fluidically connected to a pressure relief device, the pressure relief device fluidically connected to a reduced pressure purge gas conduit, at least one purge gas diffuser, and purge gas exit holes, wherein the bladder fill conduit is configured to introduce purge gas into the bladder, wherein the bladder is configured to expand and form a seal between the cannister and the piping assembly to be welded, and wherein the bladder return conduit is configured to evacuate excess purge gas from the bladder, wherein the pressure relief device is configured to maintain a pressure of between 5 psig and 50 psig in the bladder.

15. The apparatus of claim 14, wherein the cannister has a diameter approximately 1 inch less than the smallest inside diameter of the piping assembly to be welded.

16. The apparatus of claim 14, wherein the cannister has a length of between 3 inches and 12 inches.

17. The apparatus of claim 14, wherein the at least one purge diffuser is selected from the group consisting of perforated coils constructed of copper or stainless steel tubing, layers of steel wool, and a metal screen.

\* \* \* \* \*